United States Patent
Lin

(10) Patent No.: US 11,206,209 B2
(45) Date of Patent: Dec. 21, 2021

(54) METHOD FOR LINK AGGREGATION AND RELATED PRODUCTS

(71) Applicant: Guangdong Oppo Mobile Telecommunications Corp., Ltd., Guangdong (CN)

(72) Inventor: Jinquan Lin, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 208 days.

(21) Appl. No.: 16/539,771

(22) Filed: Aug. 13, 2019

(65) Prior Publication Data

US 2020/0067826 A1 Feb. 27, 2020

(30) Foreign Application Priority Data

Aug. 23, 2018 (CN) .......................... 201810972219.6

(51) Int. Cl.
*H04L 12/709* (2013.01)
*H04W 76/15* (2018.01)
*H04L 12/891* (2013.01)
*H04L 12/803* (2013.01)

(52) U.S. Cl.
CPC .......... *H04L 45/245* (2013.01); *H04L 47/125* (2013.01); *H04L 47/41* (2013.01); *H04W 76/15* (2018.02)

(58) Field of Classification Search
None
See application file for complete search history.

(56) References Cited

U.S. PATENT DOCUMENTS

| | | |
|---|---|---|
| 7,782,856 B1 | 8/2010 | Larsen et al. |
| 7,898,959 B1 | 3/2011 | Arad |
| 9,178,839 B2 | 11/2015 | Cardona et al. |
| 9,203,770 B2 | 12/2015 | Soffer et al. |
| 9,548,892 B2 | 1/2017 | Labonte et al. |
| 2006/0056424 A1* | 3/2006 | Lih ..................... H04L 49/3045 370/401 |
| 2011/0103396 A1 | 5/2011 | Cardona et al. |

(Continued)

FOREIGN PATENT DOCUMENTS

| | | |
|---|---|---|
| CN | 101674283 A | 3/2010 |
| CN | 101874386 A | 10/2010 |

(Continued)

OTHER PUBLICATIONS

English translation of Notification to Grant Patent Right for Invention issued in corresponding CN application No. 201810972219.6 dated Jun. 3, 2020.

(Continued)

*Primary Examiner* — Mariela Vidal Carpio

(74) *Attorney, Agent, or Firm* — Young Basile Hanlon & MacFarlane, P.C.

(57) ABSTRACT

Provided are a method for link aggregation and related products. The method includes the following. Link tag information in a first data packet to be transmitted is acquired. A first wireless communication link, from multiple wireless communication links enabled, corresponding to the link tag information in the first data packet is determined. The first data packet is transmitted via a link interface of the first wireless communication link.

18 Claims, 5 Drawing Sheets

Acquiring, by an electronic device, link tag information in a first data packet to be transmitted — 101

Determining, by the electronic device, from multiple wireless communication links enabled, a first wireless communication link corresponding to the link tag information in the first data packet — 102

Transmitting, by the electronic device, the first data packet via a link interface of the first wireless communication link — 103

(56) References Cited

U.S. PATENT DOCUMENTS

| | | | | |
|---|---|---|---|---|
| 2012/0124398 | A1* | 5/2012 | Diab | H04L 43/0817 |
| | | | | 713/310 |
| 2013/0003559 | A1* | 1/2013 | Matthews | H04L 12/12 |
| | | | | 370/241 |
| 2014/0029527 | A1* | 1/2014 | Okuda | H04W 72/085 |
| | | | | 370/329 |
| 2017/0075845 | A1 | 3/2017 | Kopparthi | |
| 2017/0155548 | A1* | 6/2017 | Lindstrom | H04L 45/021 |
| 2017/0302568 | A1* | 10/2017 | Meng | H04L 29/06 |
| 2018/0054724 | A1 | 2/2018 | Cariou et al. | |
| 2019/0319873 | A1* | 10/2019 | Shelar | H04L 45/22 |
| 2019/0379767 | A1* | 12/2019 | Sharma | H04L 49/9026 |
| 2020/0068475 | A1* | 2/2020 | Lin | H04W 36/0007 |
| 2020/0187174 | A1* | 6/2020 | Tang | H04W 72/042 |

FOREIGN PATENT DOCUMENTS

| | | | |
|---|---|---|---|
| CN | 101969652 | A | 2/2011 |
| CN | 102752222 | A | 10/2012 |
| CN | 103294541 | A | 9/2013 |
| CN | 103580842 | A | 2/2014 |
| CN | 103621165 | A | 3/2014 |
| CN | 103944671 | A | 7/2014 |
| CN | 104025552 | A | 9/2014 |
| CN | 104980988 | A | 10/2015 |
| CN | 105656798 | * | 6/2016 |
| CN | 105656798 | A | 6/2016 |
| CN | 105704759 | A | 6/2016 |
| CN | 105898794 | A | 8/2016 |
| CN | 106850455 | A | 6/2017 |
| CN | 107682882 | A | 2/2018 |
| CN | 107786738 | A | 3/2018 |
| CN | 108200604 | A | 6/2018 |
| CN | 104917678 | B | 7/2018 |
| CN | 108337698 | A | 7/2018 |
| JP | 2015106865 | A | 6/2015 |
| WO | 2016195553 | A1 | 12/2016 |
| WO | 2017204575 | A1 | 11/2017 |

OTHER PUBLICATIONS

English translation of the first office action issued in corresponding CN application No. 201810972219.6 dated Jan. 16, 2020.

"Using Linux Policy Routing for Double Outlet Load Balancing", posted by qiuske, dated May 17, 2012. http://blog.chinaunix.net/uid-13423994-id-3212414.html.

"Linux-Iptable Detailed Description", posted by John_ABC, dated Mar. 26, 2016. https://www.cnblogs.com/JohnABC/p/5324319.html.

"Implementation of Linux nf_conntrack Connection Tracking", posted by adamska0104, dated May 30, 2016. https://blog.csdn.net/adamska0104/article/details/51536450.

International search report issued in corresponding international application No. PCT/CN2019/100453 dated Oct. 30, 2019.

Extended European search report issued in corresponding European application No. 19192615.3 dated Dec. 3, 2019.

European communication pursuant to Article 94(3) for EP Application 19192615.3 dated Jan. 22, 2021. (5 pages).

Indian Examination Report for IN Application 201914033660 dated May 31, 2021. (5 pages).

Chinese Office Action with English Translation for CN Application 202010836201.0 dated Oct. 19, 2021. (18 pages).

* cited by examiner

METHOD FOR LINK AGGREGATION AND RELATED PRODUCTS

CROSS-REFERENCE TO RELATED APPLICATION(S)

This application claims priority to Chinese Patent Application No. 201810972219.6, filed on Aug. 23, 2018, the entire disclosure of which is hereby incorporated by reference.

TECHNICAL FIELD

This disclosure relates to the field of electronic device technology, and more particularly to a method for link aggregation and related products.

BACKGROUND

With the popularization of electronic devices (such as, smart phones), an increasing number of applications are installed on users' electronic devices, such as video applications, game applications, music applications, etc., where a large number of applications need to be used with wireless communication networks.

At present, during usage of the electronic device, within a period, only one wireless communication network such as a mobile data network (e.g., long term evolution (LTE) data network) or a wireless fidelity (Wi-Fi®) network can be used. However, a problem that data transmission of the electronic device is unstable when in network connection status often occurs.

SUMMARY

In implementations of disclosure, a method for link aggregation and related products are provided.

According to a first aspect of the disclosure, a method for link aggregation is provided. The method is applicable to an electronic device. The method includes the following. Link tag information in a first data packet to be transmitted is acquired. A first wireless communication link, from multiple wireless communication links enabled, corresponding to the link tag information in the first data packet is determined. The first data packet is transmitted via a link interface of the first wireless communication link.

According to a second aspect of the disclosure, an electronic device is provided. The electronic device includes a processor, a memory, and one or more programs stored in the memory. The one or more programs, when executed, are operable with the processor to: acquire, link tag information in a first data packet to be transmitted; determine, from multiple wireless communication links enabled, a first wireless communication link corresponding to the link tag information in the first data packet; transmit the first data packet via a link interface of the first wireless communication link.

According to a third aspect of the disclosure, a non-transitory computer readable storage medium is provided. The computer readable storage medium is applicable to an electronic device and configured to store computer programs. The computer programs, when executed, are operable with a computer to: determine a data stream corresponding to a first data packet to be transmitted; determine, from multiple wireless communication links enabled, a first wireless communication link corresponding to the first data packet according to a mapping relationship between the multiple wireless communication links and multiple data streams; transmit the first data packet via a link interface of the first wireless communication link.

BRIEF DESCRIPTION OF THE DRAWINGS

To describe the technical solutions of the implementations of the disclosure or the related art more clearly, the following will give a brief description of accompanying drawings used for describing the implementations of the disclosure or the related art. Apparently, the accompanying drawings described in the following are merely some implementations of the disclosure. Those of ordinary skill in the art can also obtain other accompanying drawings based on the accompanying drawings described below without creative efforts.

DETAILED DESCRIPTION

In order to enable those skilled in the art to better understand solutions of the disclosure, technical solutions embodied in implementations of the disclosure will be described in a clear and comprehensive manner in conjunction with the accompanying drawings. It is evident that the implementations described herein are merely some rather than all of the implementations of the disclosure. All other implementations obtained by those of ordinary skill in the art based on the implementations of the disclosure without creative efforts shall fall within the protection scope of the disclosure.

The terms "first", "second", and the like used in the specification, the claims, and the accompany drawings of the disclosure are used to distinguish different objects rather than describe a particular order. The terms "include", "comprise", and "have" as well as variations thereof are intended to cover non-exclusive inclusion. For example, a process, method, system, product, or apparatus including a series of steps or units is not limited to the listed steps or units, on the contrary, it can optionally include other steps or units that are not listed; alternatively, other steps or units inherent to the process, method, product, or device can be included either.

The term "implementation" referred to herein means that a particular feature, structure, or feature described in conjunction with the implementation may be contained in at least one implementation of the disclosure. The phrase appearing in various places in the specification does not necessarily refer to the same implementations, nor does it refer to an independent or alternative implementation that is mutually exclusive with other implementations. It is expressly and implicitly understood by those skilled in the art that an implementation described herein may be combined with other implementations.

The electronic device involved in the implementations of the disclosure may include various handheld devices, in-vehicle devices, wearable devices, computing devices that have wireless communication functions or other processing devices connected to the wireless modem, as well as various forms of user equipment (UE), mobile stations (MS), terminal devices, and the like. For convenience of description, the devices mentioned above are collectively referred to as electronic devices. The following will describe the technical solutions of the disclosure in detail.

A method for link aggregation is provided. The method is applicable to an electronic device and includes the following. Link tag information in a first data packet to be transmitted is acquired. A first wireless communication link, from multiple wireless communication links enabled, corresponding to the link tag information in the first data packet is determined. The first data packet is transmitted via a link interface of the first wireless communication link.

Figure 1:
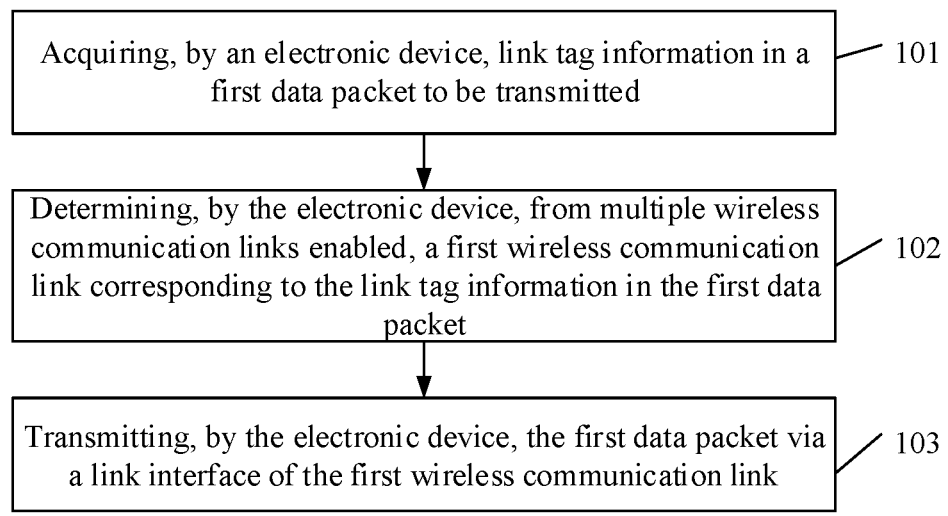
FIG. 1 is a schematic flow chart illustrating a method for link aggregation according to an implementation of the disclosure.

FIG. 1 is a schematic flow chart illustrating a method for link aggregation according to an implementation of the disclosure. The method is applicable to an electronic device. As illustrated in FIG. 1, the method begins at block 101.

At block 101, the electronic device acquires link tag information in a first data packet to be transmitted.

In one example, the first data packet carries the link tag information. The link tag information is used to indicate a specific wireless communication link. The link tag information may be presented in various forms, for instance, may be a mark value. For example, when the mark value is 0x64/0x1ffff, it indicates that the wireless communication link is a Wi-Fi network link. For another example, when the mark value is 0x65/0x1ffff, it indicates that the wireless communication link is an LTE data network link, which is not limited herein.

At block 102, the electronic device determines, from multiple wireless communication links enabled, a first wireless communication link corresponding to the link tag information in the first data packet.

In one example, the electronic device is able to enable the multiple wireless communication links simultaneously. The multiple wireless communication links may include a Wi-Fi network link, an LTE data network link, a near field communication (NFC) link, a Bluetooth link, and so on. The disclosure is not limited thereto.

In general, link aggregation technology refers to that the electronic device is able to enable multiple wireless communication links at the same time. With aid of the link aggregation technology, the electronic device is able to use two or more network ports to access the internet at the same time. For example, with aid of the link aggregation technology, a mobile phone is able to use both the Wi-Fi network and the LTE data network to access the network.

In one example, when the electronic device simultaneously enables the multiple wireless communication links, it indicates that in the electronic device multiple routing tables exist. Each routing table contains a correspondence relationship between link tag information and wireless communication network interfaces. In other words, the electronic device can query the routing table to determine the first wireless communication link corresponding to the link tag information in the first data packet.

At block 103, the electronic device transmits the first data packet via a link interface of the first wireless communication link.

It can be concluded that, in the implementations of the disclosure, the electronic device acquires the link tag information in the first data packet to be transmitted, and determines, from the multiple wireless communication links enabled, the first wireless communication link corresponding to the link tag information in the first data packet. Thereafter, the electronic device transmits the first data packet via the link interface of the first wireless communication link. As can be seen, the electronic device is able to simultaneously enable the multiple wireless communication links, thereby avoiding unstable data transmission caused by only using one wireless communication link. In addition, after the multiple wireless communication links are simultaneously enabled, the electronic device can determine, according to link tag information in each data packet, a link interface of a wireless communication link for transmission of each data packet, thus avoiding data transmission disorder caused by using the multiple wireless communication links. In this way, it is possible to transmit data orderly when the multiple wireless communication links are enabled in the electronic devices, and facilitate selection of a link interface by using the link tag information.

In one implementation of the disclosure, the electronic device further includes multiple second data packets to be transmitted. The method further includes the following. According to link tag information in each of the multiple second data packets, the multiple second data packets are divided into multiple groups of second data packets, where each of the multiple groups of second data packets has same link tag information. Multiple second wireless communication links are determined, where the multiple second wireless communication links are in correspondence with link tag information in the multiple groups of second data packets. Each of the multiple groups of second data packets is transmitted via a link interface of a corresponding second wireless communication link.

In one example, assuming that the multiple groups of second data packets includes two groups of second data packets, and link tag information in each second data packet in a first group of second data packets is 0x64/0x1ffff, the first group of second data packets are transmitted via a link interface of the Wi-Fi network link. If link tag information in each second data packet in a second group of second data packets is 0x65/0x1ffff, the second group of second data packets are transmitted via a link interface of the LTE data network link.

As can be seen, in the implementation of the disclosure, when the electronic device includes the multiple second data packets to be transmitted, the multiple second data packets are divided according to the link tag information in each of the multiple second data packets, so that the electronic device can implement data transmission by using the multiple second wireless communication links simultaneously, thereby improving speed and efficiency of the data transmission.

In one implementation of the disclosure, before acquiring, the link tag information in the first data packet to the transmitted, the method further includes the following. Based on that the first data packet is in cache status, a data stream corresponding to the first data packet is determined. The first wireless communication link corresponding to the data stream is determined according to a first mapping relationship between the multiple wireless communication links and multiple data streams. A routing table is queried to add the link tag information corresponding to the first wireless communication link to the first data packet, where the routing table contains a correspondence relationship between link tag information and the multiple wireless communication links.

The data stream is a set of data packets having a same data type. For example, video data packets belong to one data stream and picture data packets belong to another data stream. The data stream corresponding to the first data packet may be determined according to a data type of the first data packet.

Each data stream corresponds to one wireless communication link. The first mapping relationship is a mapping relationship between multiple data streams and multiple wireless communication links. The first mapping relationship in the electronic device can be pre-set by the technical developer. Alternatively, the first mapping relationship may be established according to multiple data streams, where the multiple data streams are allocated by the electronic device according to a transmission rate or a transmission delay of each of the multiple wireless communication links enabled at current time. The disclosure is not limited herein.

As can be seen, in the implementation of the disclosure, when the first data packet is in the cache status, the electronic device adds the link tag information to the first data packet by determining the data stream corresponding to the first data packet and the first mapping relationship, rather than determines, according to the data stream, the first mapping relationship, and the routing table, the first wireless communication link corresponding to the first data packet to implement data transmission when the first data packet is waiting for transmission. In this way, it is possible to reduce a transmission delay of the first data packet.

In one implementation of the disclosure, before determining the first wireless communication link corresponding to the data stream according to the first mapping relationship, the following can be conducted. A maximum transmission rate of each of the enabled multiple wireless communication links is determined within a first preset period. A data stream allocation weight for each of the multiple wireless communication links is determined according to the maximum transmission rate of each of the multiple wireless communication links. The first mapping relationship between the multiple wireless communication links and the multiple data streams is established according to the data stream allocation weight for each of the multiple wireless communication links.

For example, the first preset period may be 5 seconds, 10 seconds, or the like. The disclosure is not limited thereto.

The data stream allocation weight refers to a weight value of a data stream when performing data-stream allocation for each of the multiple wireless communication links. A sum of the data stream allocation weights for the multiple wireless communication links is equal to one. Various manners can be used to determine the data stream allocation weight for each of the multiple wireless communication links according to the maximum transmission rate of each of the multiple wireless communication links. For example, the data stream allocation weight for each of the multiple wireless communication links is determined according to a ratio of the maximum transmission rate of each of the multiple wireless communication links to a sum of the maximum transmission rates of the multiple wireless communication links. Alternatively, a correspondence relationship between the multiple maximum transmission rates and the multiple data stream allocation weights may be set in advance in the electronic device, and then the data stream allocation weight for each of the multiple wireless communication links is determined according to the correspondence relationship, which is not limited herein.

In one example, various manners can be used to establish the first mapping relationship between the multiple wireless communication links and the multiple data streams according to the data stream allocation weight for each of the multiple wireless communication links. For example, according to the data stream allocation weight for each of the multiple wireless communication links, the multiple wireless communication links may be divided into three types, that is, fast wireless communication links, normal wireless communication links, and slow wireless communication links, and then the first mapping relationship between the multiple wireless communication links and the multiple data streams is determined according to a preset mapping relationship between the multiple data streams and the fast wireless communication links, the normal wireless communication links, and the slow wireless communication links. For another example, the multiple data streams may be divided according to data types, for instance, data streams with larger data amount are divided into a first group and data streams with smaller data amount are divided into a second group, and so on, and the first mapping relationship between the multiple wireless communication links and the multiple data streams is determined according to the number of the multiple wireless communication links and the data stream allocation weight for each of the multiple wireless communication links. The disclosure is not limited thereto.

As can be seen, in the implementation of the disclosure, the electronic device determines the data stream allocation weight for each of the multiple wireless communication links according to the maximum transmission rate of each of the multiple wireless communication links, and further determines the multiple wireless communication links each for transmission of one of the multiple data streams, thereby making it rational and standardized when the multiple wireless communication links are used for data transmission at the same time.

In one implementation of the disclosure, the data stream allocation weight for each of the multiple wireless communication links is determined according to the maximum transmission rate of each of the multiple wireless communication links as follows. A sum of the maximum transmission rates of the multiple wireless communication links is determined as a first reference value. The maximum transmission rate of each of the multiple wireless communication links divided by the first reference value is determined as the data stream allocation weight for each of the multiple wireless communication links.

As can be seen, in the implementation of the disclosure, the electronic device determines the data stream allocation weight for each of the multiple wireless communication links according to the maximum transmission rate of each of the multiple wireless communication links and the sum of the maximum transmission rates of the multiple wireless communication links. Different data stream allocation weights can be determined according to the number of wireless communication links enabled at different periods, thereby improving the link aggregation.

In one implementation of the disclosure, the first mapping relationship between the multiple wireless communication links and the multiple data streams is determined according to the data stream allocation weight for each of the multiple wireless communication links as follows. The multiple data streams are sorted according to the data types. In the order of the multiple data streams, the multiple data streams are divided into multiple groups of data streams according to the number of the multiple wireless communication links and the data stream allocation weight for each of the multiple wireless communication links, where the number of the multiple groups of data streams and the number of the multiple wireless communication links are the same. A correspondence between the multiple wireless communication links and the multiple groups of data streams is determined to establish the first mapping relationship between the multiple wireless communication links and the multiple data streams.

In one example, the multiple data streams are established by the electronic device within a second preset period. For example, three data streams or four data streams are established. The data packets in each of the multiple data streams have a same data type.

The multiple data streams are sorted according to the data types as follows. A sorting manner of all data streams is pre-stored in electronic device. The electronic device sorts the multiple data streams according to the pre-stored sorting manner.

For example, assuming that at current time, there are three data streams, i.e., a first data stream, a second stream, and a third data stream in sequence, and there are two wireless communication links, i.e., the Wi-Fi network link and the LTE data network link, the data stream in front of the sequence corresponds to a wireless communication link with a high data stream allocation weight. A data stream allocation weight for the Wi-Fi network link is ⅔ and a data stream allocation weight for the LTE data network link is ⅓, then the three data streams may be needed to be divided into two groups, that is, a first group including the first data stream and the second data stream and a second group including the third data stream, and the first group corresponds to the Wi-Fi network link and the second group corresponds to the LTE data network link.

As can be seen, in the implementation of the disclosure, the electronic device sorts the multiple data streams according to the data types, and further establishes the first mapping relationship between the multiple wireless communication links and the multiple data streams according to the sorting result, the number of the multiple wireless communication links, and the data stream allocation weight for each of the multiple wireless communication links. In this way, it is possible to make data packet transmission standardized and rational in link aggregation status, thereby effectively improving efficiency of data transmission.

In one implementation of the disclosure, before acquiring the link tag information in the first data packet to be transmitted, the following can be conducted. Based on a split-screen operation for two applications and that the two applications include a game application, a transmission delay of a wireless communication links enabled is determined. Based on that the transmission delay is longer than a preset delay threshold, at least one wireless communication link other than the wireless communication link enabled is enabled. The wireless communication link enabled and the at least one wireless communication link enabled are determined as the multiple wireless communication links enabled.

In one example, there is no limit to the number of the at least one of the multiple wireless communication links. For example, the electronic device can determine the number of the at least one wireless communication link according to different transmission delays.

As such, in the implementation of the disclosure, when the two applications involved in the split-screen operation include the game application, the multiple wireless communication links can be automatically enabled according to the transmission delay of the wireless communication links enabled at current time, which is beneficial for improving the intelligence of link aggregation.

Figure 2:
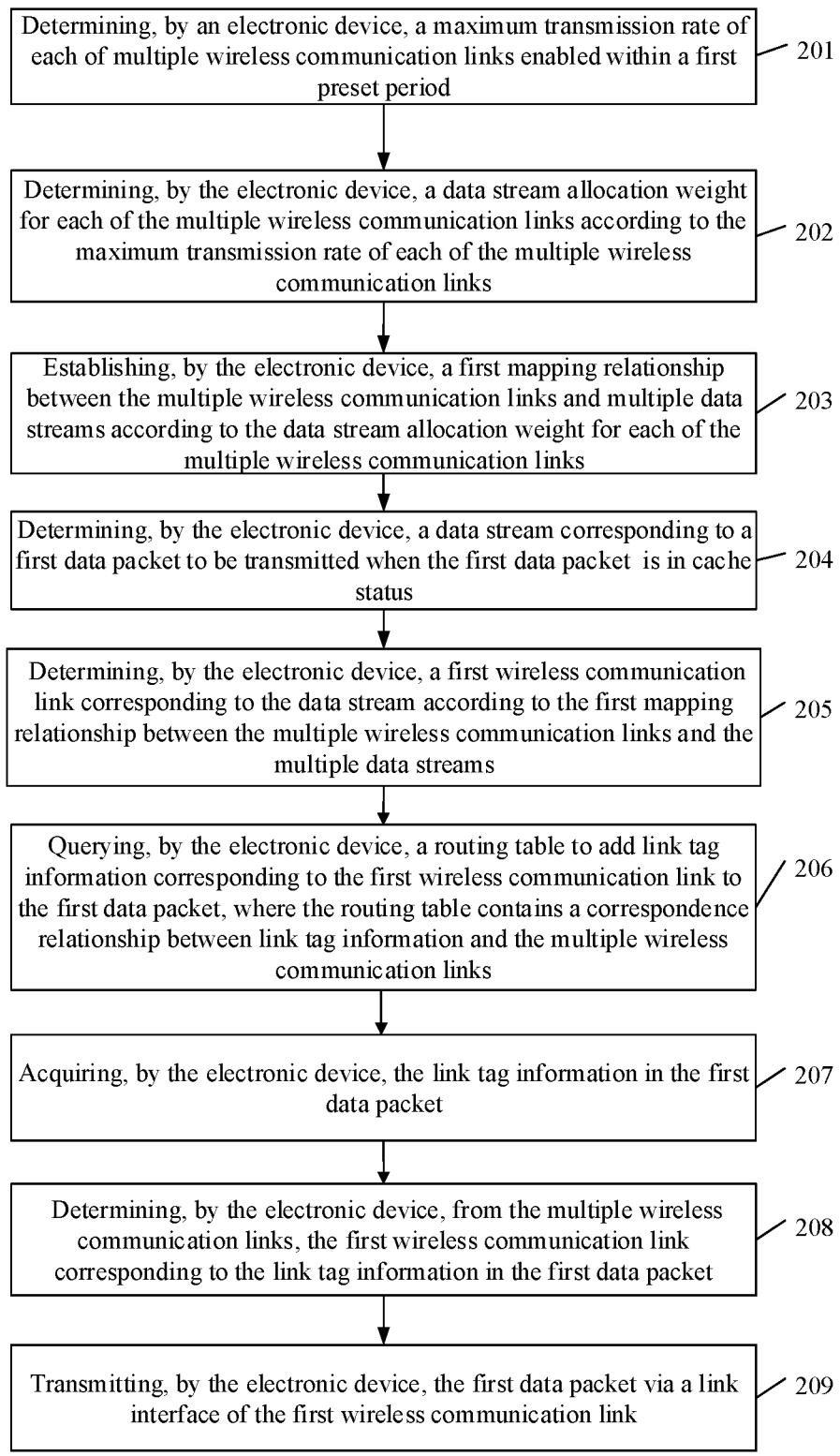
FIG. 2 is a schematic flow chart illustrating a method for link aggregation according to another implementation of the disclosure.

Consistent with the implementations illustrated in FIG. 1, FIG. 2 is a schematic flow chart illustrating a method for link aggregation according to another implementation of the disclosure. The method is applicable to an electronic device. As illustrated in FIG. 2, the method begins at block 201.

At block 201, the electronic device determines a maximum transmission rate of each of enabled multiple wireless communication links within a first preset period.

At block 202, the electronic device determines a data stream allocation weight for each of the multiple wireless communication links according to the maximum transmission rate of each of the multiple wireless communication links.

At block 203, the electronic device establishes a first mapping relationship between the multiple wireless communication links and multiple data streams according to the data stream allocation weight for each of the multiple wireless communication links.

At block 204, when a first data packet to be transmitted is in cache status, the electronic device determines a data stream corresponding to the first data packet.

At block 205, the electronic device determines a first wireless communication link corresponding to the data stream according to the first mapping relationship between the multiple wireless communication links and the multiple data streams.

At block 206, the electronic device queries a routing table to add link tag information corresponding to the first wireless communication link to the first data packet, where the routing table contains a correspondence relationship between link tag information and the multiple wireless communication links.

At block 207, the electronic device acquires the link tag information in the first data packet.

At block 208, the electronic device determines, from the multiple wireless communication links, the first wireless communication link corresponding to the link tag information in the first data packet.

At block 209, the electronic device transmits the first data packet via a link interface of the first wireless communication link.

As such, in the implementations of the disclosure, the electronic device acquires the link tag information in the first data packet to be transmitted, and determines, from the multiple wireless communication links enabled, the first wireless communication link corresponding to the link tag information in the first data packet. Thereafter, the electronic device transmits the first data packet via the link interface of the first wireless communication link. In this manner, the electronic device is able to simultaneously enable multiple wireless communication links, thereby avoiding unstable data transmission caused by only using one wireless communication link. In addition, after the multiple wireless communication links are simultaneously enabled, the electronic device can determine, according to link tag information in each data packet, a link interface of a wireless communication link for transmission of each data packet, thus avoiding data transmission disorder caused by using the multiple wireless communication links. In this way, it is possible to transmit data orderly when the multiple wireless communication links are enabled in the electronic devices, thereby facilitating selection of a link interface by using the link tag information.

Moreover, the electronic device determines the data stream allocation weight for each of the multiple wireless communication links according to the maximum transmission rate of each of the multiple wireless communication links, and further determines the multiple wireless communication links each for transmission of one of the multiple data streams, thereby making it rational and standardized when the multiple wireless communication links are used for data transmission at the same time.

In addition, when the first data packet is in cache status, the electronic device adds the link tag information to the first data packet by determining the data stream corresponding to the first data packet and the first mapping relationship, rather than determines, according to the data stream, the first mapping relationship, and the routing table, the first wireless communication link corresponding to the first data packet to implement data transmission when the first data packet is waiting for transmission. In this way, it is possible to reduce a transmission delay of the first data packet.

Figure 3:
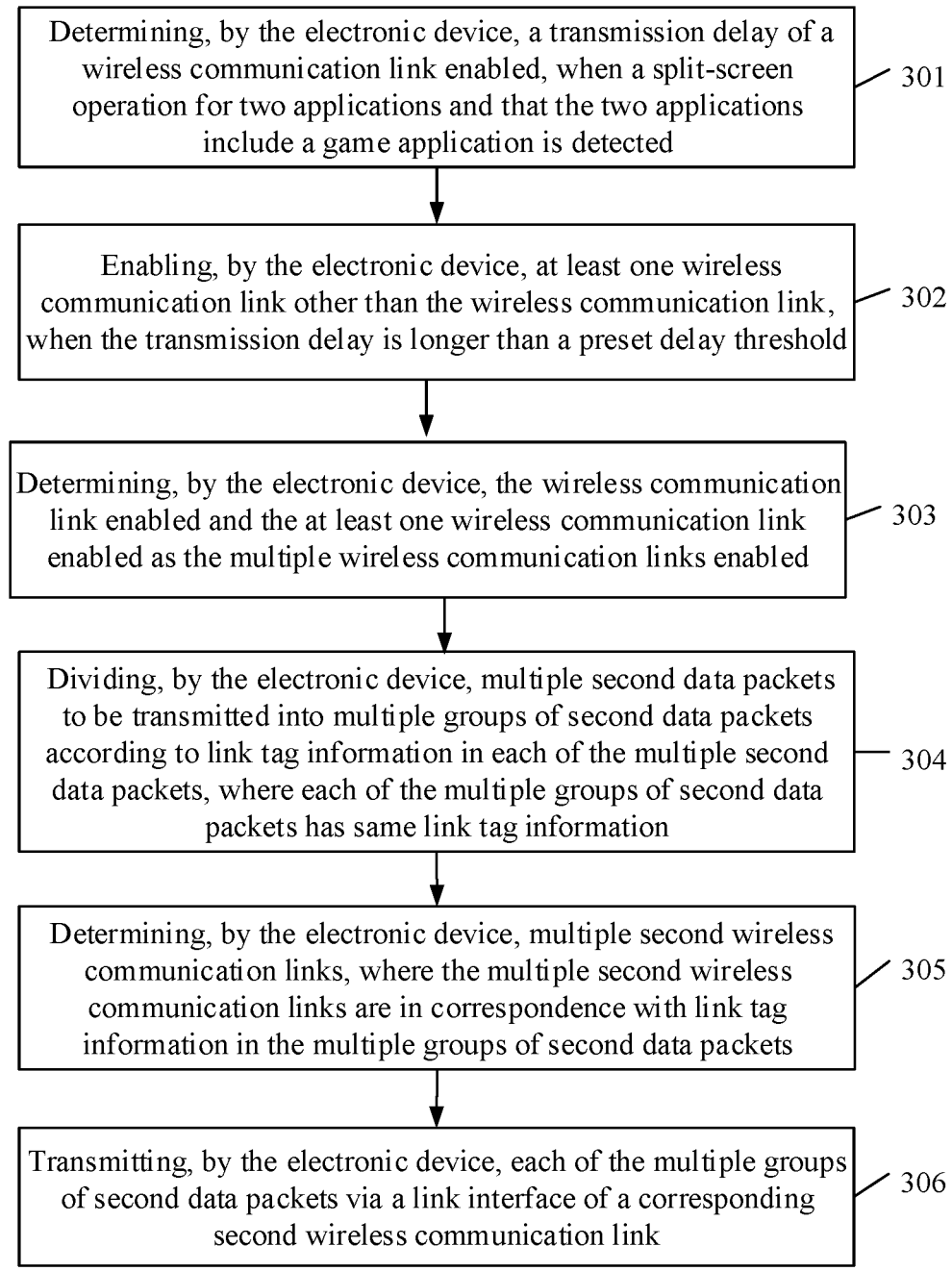
FIG. 3 is a schematic flow chart illustrating a method for link aggregation according to yet another implementation of the disclosure.

Consistent with the implementations illustrated in FIG. 1, FIG. 3 is a schematic flow chart illustrating a method for link aggregation according to yet another implementation of the disclosure. The method is applicable to an electronic device. As illustrated in FIG. 3, the method begins at block 301.

At block 301, when a split-screen operation for two applications and that the two applications include a game application is detected, the electronic device determines a transmission delay of a wireless communication link enabled.

At block 302, when the transmission delay is longer than a preset delay threshold, the electronic device enables at least one wireless communication link other than the wireless communication link enabled.

At block 303, the electronic device determines the wireless communication link enabled and the at least one wireless communication link enabled as the multiple wireless communication links enabled.

At block 304, the electronic device divides multiple second data packets to be transmitted into multiple groups of second data packets according to link tag information in each of the multiple second data packets, where each of the multiple groups of second data packets has same link tag information.

At block 305, the electronic device determines multiple second wireless communication links, where the multiple second wireless communication links are in correspondence with link tag information in the multiple groups of second data packets.

At block 306, the electronic device transmits each of the multiple groups of second data packets via a link interface of a corresponding second wireless communication link.

As can be seen, in the implementations of the disclosure, the electronic device acquires the link tag information in the first data packet to be transmitted, and determines, from the multiple wireless communication links enabled, the first wireless communication link corresponding to the link tag information in the first data packet. Thereafter, the electronic device transmits the first data packet via the link interface of the first wireless communication link. In this manner, the electronic device is able to simultaneously enable multiple wireless communication links, thereby avoiding unstable data transmission caused by only using one wireless communication link. In addition, after the multiple wireless communication links are simultaneously enabled, the electronic device can determine, according to link tag information in each data packet, a link interface of a wireless communication link for transmission of each data packet, thus avoiding data transmission disorder caused by using the multiple wireless communication links. In this way, it is possible to transmit data orderly when the multiple wireless communication links are enabled in the electronic devices, and facilitate selection of a link interface by using the link tag information.

Moreover, based on the split-screen operation for two applications and that the two applications include a game application, the multiple wireless communication links can be automatically enabled according to the transmission delay of the wireless communication link enabled at current time, which is beneficial for improving the intelligence of link aggregation.

In addition, when the electronic device includes multiple second data packets to be transmitted, the multiple second data packets are divided according to link tag information in each of the multiple second data packets, so that the electronic device can implement data transmission by using the multiple second wireless communication links simultaneously, which is beneficial for improving speed and efficiency of the data transmission.

Figure 4:
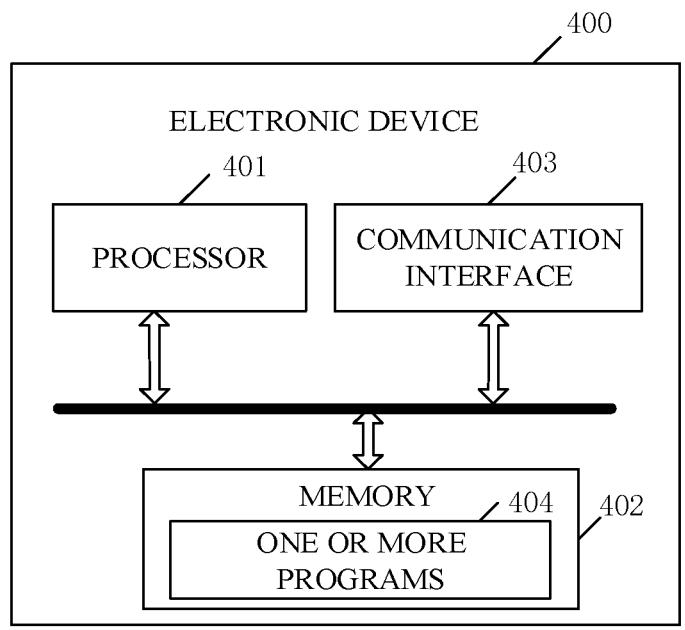
FIG. 4 is a schematic structural diagram illustrating an electronic device according to an implementation of the disclosure.

Consistent with the implementations illustrated in FIG. 1, FIG. 2, and FIG. 3, FIG. 4 is a schematic structural diagram illustrating an electronic device according to an implementation of the disclosure. As illustrated in FIG. 4, the electronic device includes a processor 401, a memory 402, a communication interface 403, and one or more programs 404. The one or more programs 404 are stored in the memory 402 and configured to be performed by the processor 401. The one or more programs 404 include instructions being operable to perform operations of the following. Link tag information in a first data packet to be transmitted is acquired. A first wireless communication link, from among multiple wireless communication links enabled, corresponding to the link tag information in the first data packet is determined. The first data packet is transmitted via a link interface of the first wireless communication link.

It can be concluded that, in the implementations of the disclosure, the electronic device acquires the link tag information in the first data packet to be transmitted and determines, from the multiple wireless communication links enabled, the first wireless communication link corresponding to the link tag information in the first data packet. Thereafter, the electronic device transmits the first data packet via the link interface of the first wireless communication link. As can be seen, the electronic device is able to simultaneously enable the multiple wireless communication links, thereby avoiding unstable data transmission caused by only using one wireless communication link. In addition, after the multiple wireless communication links are simultaneously enabled, the electronic device can determine, according to link tag information in each data packet, a link interface of a wireless communication link for transmission of each data packet, thus avoiding data transmission disorder caused by using the multiple wireless communication links. Therefore, it is beneficial for transmitting data orderly when the multiple wireless communication links are enabled in the electronic devices and facilitate selection of a link interface by using the link tag information.

In one implementation of the disclosure, the electronic device further includes multiple second data packets to be transmitted. The one or more programs 404 further include instructions operable to perform operations of the following. According to link tag information in each of the multiple second data packets, the multiple second data packets are divided into multiple groups of second data packets, where each of the multiple groups of second data packets has same link tag information. Multiple second wireless communication links are determined, where the multiple second wireless communication links are in correspondence with link tag information in the multiple groups of second data packets. Each of the multiple groups of second data packets is transmitted via a link interface of one of the multiple second wireless communication links.

In one implementation of the disclosure, before acquiring the link tag information in the first data packet to be transmitted, the one or more programs 404 further include instructions operable to perform operations of the following. When the first data packet is in cache status, a data stream corresponding to the first data packet is determined. The first wireless communication link corresponding to the data stream is determined according to a first mapping relationship between the multiple wireless communication links and multiple data streams. A routing table is queried to add the link tag information corresponding to the first wireless communication link to the first data packet, where the routing table contains a correspondence relationship between link tag information and the multiple wireless communication links.

In one implementation of the disclosure, before determining the first wireless communication link corresponding to the data stream according to the first mapping relationship, the one or more programs 404 further include instructions operable to perform operations of the following. A maximum transmission rate of each of the multiple wireless communication links enabled is determined within a first preset period. A data stream allocation weight for each of the multiple wireless communication links is determined according to the maximum transmission rate of each of the multiple wireless communication links. The first mapping relationship is established between the multiple wireless communication links and the multiple data streams according to the data stream allocation weight for each of the multiple wireless communication links.

In one implementation of the disclosure, in terms of determining the data stream allocation weight for each of the multiple wireless communication links according to the maximum transmission rate of each of the multiple wireless communication links, the one or more programs 404 include instructions operable to perform operations of the following. A sum of the maximum transmission rates of the multiple wireless communication links is determined as a first reference value. The maximum transmission rate of each of the multiple wireless communication links divided by the first reference value is determined as the data stream allocation weight for each of the multiple wireless communication links.

In one implementation of the disclosure, in terms of establishing the first mapping relationship between the multiple wireless communication links and the multiple data streams according to the data stream allocation weight for each of the multiple wireless communication links, the one or more programs 404 include instructions operable to perform operations of the following. The multiple data streams are sorted according to data types. In the order of the multiple data streams, the multiple data streams are divided into multiple groups of data streams according to the number of the multiple wireless communication links and the data stream allocation weight for each of the multiple wireless communication links, where the number of the multiple groups of data streams and the number of the multiple wireless communication links are the same. A correspondence between the multiple wireless communication links and the multiple groups of data streams is determined to establish the first mapping relationship between the multiple wireless communication links and the multiple data streams.

In one implementation of the disclosure, before acquiring the link tag information in the first data packet to be transmitted, the one or more programs 404 further include instructions operable to perform operations of the following. When a split-screen operation for two applications and that the two applications include a game application are detected, a transmission delay of a wireless communication links enabled is determined. When the transmission delay is longer than a preset delay threshold, at least one wireless communication link other than the wireless communication link is enabled. The wireless communication link enabled and the at least one wireless communication link enabled are determined as the multiple wireless communication links enabled.

The foregoing implementations mainly introduce the solution of the implementation of the disclosure from the perspective of performing the process on the method side. It can be understood that the electronic device includes corresponding hardware structures and/or software modules for performing the respective functions in order to implement the above functions. Those skilled in the art will readily appreciate that the disclosure can be implemented in hardware or a combination of hardware and computer software in combination with the elements and algorithm steps of the various examples described in the implementations disclosed herein. Whether a function is implemented in hardware or computer software to drive hardware depends on the specific application and design constraints of the solution. A person skilled in the art can use different methods for each particular application to implement the described functionality, but such implementation should not be considered to be beyond the scope of the application.

In the implementations of the disclosure, the electronic device may be divided into functional unit according to the method implementations. For example, the functional units may be divided according to various functions, or two or more functions may be integrated into one processing unit. The integrated unit can be implemented in the form of hardware or in the form of a software functional unit. It should be noted that the unit division in the implementation of the disclosure is illustrative and only a logical function division, and there can be other manners of division during actual implementations.

Figure 5:
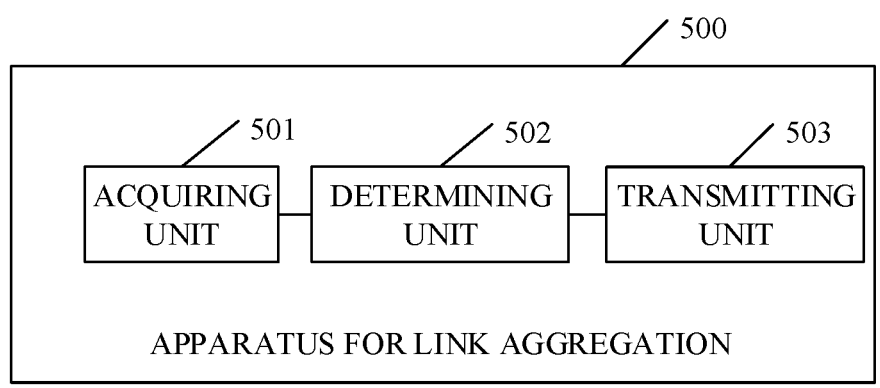
FIG. 5 is a block diagram illustrating functional units of an apparatus for link aggregation according to an implementation of the disclosure.

FIG. 5 is a block diagram illustrating functional units of an apparatus 500 for link aggregation according to an implementation of the disclosure. As illustrated in FIG. 5, the apparatus is applicable to an electronic device and includes an acquiring unit 501, a determining unit 502, and a transmitting unit 503. The acquiring unit 501 is configured to acquire link tag information in a first data packet to be transmitted. The determining unit 502 is configured to determine, from multiple wireless communication links enabled, a first wireless communication link corresponding to the link tag information in the first data packet. The transmitting unit 503 is configured to transmit the first data packet via a link interface of the first wireless communication link.

It can be concluded that, in the implementations of the disclosure, the electronic device acquires the link tag information in the first data packet to be transmitted and determines, from the multiple wireless communication links enabled, the first wireless communication link corresponding to the link tag information in the first data packet. Thereafter, the electronic device transmits the first data packet via the link interface of the first wireless communication link. As can be seen, the electronic device is able to simultaneously enable the multiple wireless communication links, thereby avoiding unstable data transmission caused by only using one wireless communication link. In addition, after the multiple wireless communication links are simultaneously enabled, the electronic device can determine, according to link tag information in each data packet, a link interface of a wireless communication link for transmission of each data packet, thus avoiding data transmission disorder caused by using the multiple wireless communication links. Therefore, it is beneficial for transmitting data orderly when the multiple wireless communication links are enabled in the electronic devices and facilitating selection of a link interface by using the link tag information.

In one implementation of the disclosure, the apparatus 500 further includes a processing unit. The electronic device further includes multiple second data packets to be transmitted. The processing unit is configured to divide, according to link tag information in each of the multiple second data packets, the multiple second data packets into multiple groups of second data packets, where each of the multiple groups of second data packets has same link tag information. The determining unit 502 is further configured to determine multiple second wireless communication links, where the multiple second wireless communication links are in correspondence with link tag information in the multiple groups of second data packets. The transmitting unit 503 is further configured to transmit each of the multiple groups of second data packets via a link interface of a corresponding second wireless communication link.

In one implementation of the disclosure, before the acquiring unit 501 acquires the link tag information in the first data packet to be transmitted, the determining unit 502 is further configured to determine, based on that the first data packet is in cache status, a data stream corresponding to the first data packet, and to determine the first wireless communication link corresponding to the data stream according to a first mapping relationship. The processing unit 504 is further configured to query a routing table to add the link tag information corresponding to the first wireless communication link to the first data packet, where the routing table contains a correspondence relationship between link tag information and the multiple wireless communication links.

In one implementation of the disclosure, before determining the first wireless communication link corresponding to the data stream according to the first mapping relationship, the determining unit 502 is further configured to: determine a maximum transmission rate of each of the multiple wireless communication links enabled within a first preset period; determine a data stream allocation weight for each of the multiple wireless communication links according to the maximum transmission rate of each of the multiple wireless communication links. The processing unit is further configured to establish the first mapping relationship between the multiple wireless communication links and multiple data streams according to the data stream allocation weight for each of the multiple wireless communication links.

In one implementation of the disclosure, the determining unit 502 configured to determine the data stream allocation weight for each of the multiple wireless communication links according to the maximum transmission rate of each of the multiple wireless communication links is configured to: determine a sum of the maximum transmission rates of the multiple wireless communication links as a first reference value; determine the maximum transmission rate of each of the multiple wireless communication links divided by the first reference value as the data stream allocation weight for each of the multiple wireless communication links.

In one implementation of the disclosure, the processing unit configured to establish the first mapping relationship between the multiple wireless communication links and the multiple data streams according to the data stream allocation weight for each of the multiple wireless communication links is configured to: sort the multiple data streams according to data types; divide, in the order of the multiple data streams, the multiple data streams into multiple groups of data streams according to the number of the multiple wireless communication links and the data stream allocation weight for each of the multiple wireless communication links, where the number of the multiple groups of data streams and the number of the multiple wireless communication links are the same; determine a correspondence between the multiple wireless communication links and the multiple groups of data streams to establish the first mapping relationship between the multiple wireless communication links and the multiple data streams.

In one implementation of the disclosure, before the acquire unit 501 acquires the link tag information in the first data packet to be transmitted, the determining unit 502 is configured to determine, when a split-screen operation for two applications and that the two applications include a game application is detected, a transmission delay of a wireless communication link enabled. The processing unit is further configured to enable, based on that the transmission delay is longer than a preset delay threshold, at least one wireless communication link other than the wireless communication link. The determining unit 502 is further configured to determine the wireless communication link enabled and the at least one wireless communication link enabled as the multiple wireless communication links enabled.

In one example, the acquiring unit 501, the determining unit 502, and the processing unit may be a processor. The transmitting unit 503 may be a communication interface or a transceiver.

Figure 6:
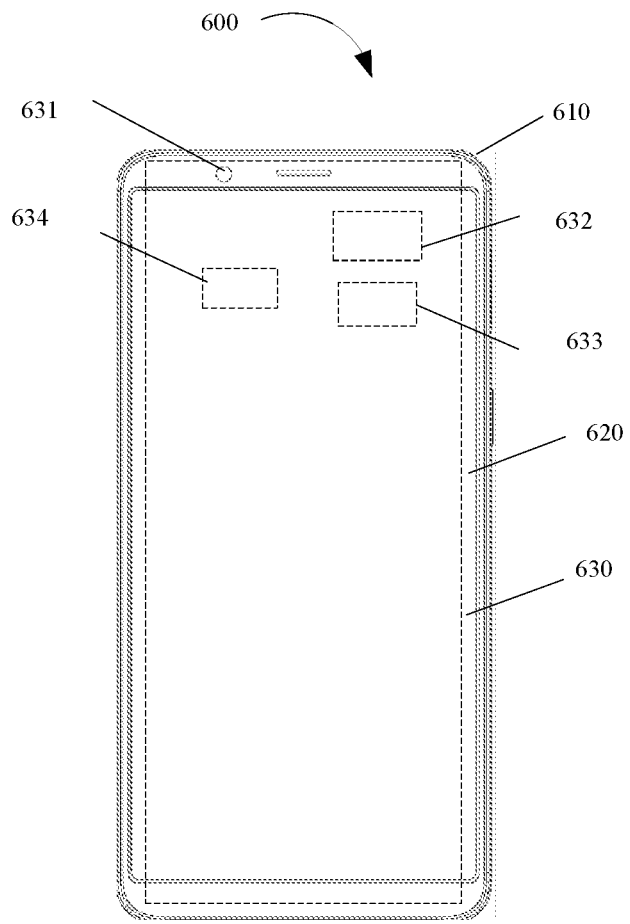
FIG. 6 is a schematic structural diagram illustrating a smart phone according to an implementation of the disclosure.

FIG. 6 is a schematic structural diagram illustrating a smart phone 600 according to an implementation of the disclosure. As illustrated in FIG. 6, the smart phone 600 includes a casing 610, a display screen 620, a main board 630. The main board 630 is equipped with a camera 631, a processor 632, a memory 633, and a power management chip 634.

In the example, the smart phone 600 is configured to acquire link tag information in a first data packet to be transmitted, to determine, from multiple wireless communication links enabled, a first wireless communication link corresponding to the link tag information in the first data packet, and to transmit the first data packet via a link interface of the first wireless communication link.

The processor 632 is a control center of the smart phone 600. The processor 632 is configured to connect various parts of the entire smart phone through various interfaces and lines, and to execute various functions of the smart phone and process data by running or executing software programs and/or modules stored in the memory 633 and invoking data stored in the memory 633, thereby monitoring the smart phone as a whole. In at least one example, the processor 632 may include at least one core processing unit. For example, the processor 632 can be integrated with an application processor and a modem processor, where the application processor is mainly configured to handle and maintain an operating system, a user interface, applications, and so on, and the modem processor is mainly configured to process wireless communication. It will be appreciated that the modem processor mentioned above may not be integrated into the processor 632.

The processor 632 can be, for example, a central processing unit (CPU), a general-purpose processor, a digital signal processors (DSP), an application-specific integrated circuit (ASIC), a field programmable gate array (FPGA), or other programmable logic devices, transistor logic devices, hardware components, or any combination thereof. Various exemplary logical blocks, modules, and circuits described in conjunction with the disclosure may be achieved or implemented. The processor 632 can be a combination of computing functions, for example, a combination of one or more microprocessors, a combination of the DSP and a microprocessor, and the like.

The memory 633 is configured to store software programs and modules. The processor 632 is configured to execute various function applications and data processing of the mobile phone by running the software programs and the modules stored in the memory 633. The memory 633 may mainly include a program storage area and a data storage area. The program storage area may store an operating system, applications required for at least one function, and the like. The data storage area may store data created according to the use of the smart phone, and the like. In addition, the memory 633 may include a high-speed random access memory (RAM), and may further include a non-transitory memory such as at least one disk storage device, a flash device, or other non-transitory solid-state storage devices. The memory 633 can be a random access memory (RAM), a flash memory, a read only memory (ROM), an erasable programmable ROM (EPROM), an electrically EPROM (EEPROM), a register, a hard disk, a mobile hard disk, a compact disc ROM (CD-ROM), or any other form of storage medium known in the field.

Implementations of the disclosure also provide a non-transitory computer readable storage medium. The non-transitory computer readable storage medium is applicable to an electronic device and configured to store computer programs for electronic data interchange. The computer programs, when executed, are operable with a computer to: determine a data stream corresponding to a first data packet to be transmitted; determine, from multiple wireless communication links enabled, a first wireless communication link corresponding to the first data packet according to a mapping relationship between the multiple wireless communication links and multiple data streams; transmit the first data packet via a link interface of the first wireless communication link. The computer includes a mobile terminal.

In one implementation of the disclosure, the computer programs, when executed, are further operable with a computer to determining the data stream corresponding to the first data packet according to a data type of the first data packet.

In one implementation of the disclosure, the computer programs, when executed, are further operable with a computer to establish the mapping relationship according to the multiple data streams, the multiple data streams being allocated by the electronic device according to a transmission rate or a transmission delay of each of the multiple wireless communication links enabled at current time.

In one implementation of the disclosure, the computer programs, when executed, are further operable with a computer to: determine, based on a split-screen operation for two applications and that the two applications include a game application, a transmission delay of a wireless communication link enabled; enable, based on that the transmission delay is longer than a preset delay threshold, at least one wireless communication link other than the wireless communication link; determine the wireless communication link enabled and the at least one wireless communication link enabled as the multiple wireless communication links enabled.

Implementations of the disclosure also provide a computer program product. The computer program product includes a non-transitory computer readable storage medium storing computer programs. The computer programs are operable with a computer to perform all or part of the operations of any of the methods for link aggregation described in the above method implementations. The computer includes a mobile terminal.

It is to be noted that, for the sake of simplicity, the foregoing method implementations are described as a series of action combinations, however, it will be appreciated by those skilled in the art that the disclosure is not limited by the sequence of actions described. According to the present disclosure, certain steps or operations may be performed in other order or simultaneously. Besides, it will be appreciated by those skilled in the art that the implementations described in the specification are exemplary implementations and the actions and modules involved are not necessarily essential to the present disclosure.

In the foregoing implementations, the description of each implementation has its own emphasis. For the parts not described in detail in one implementation, reference may be made to related descriptions in other implementations.

In the implementations of the disclosure, it should be understood that, the apparatus disclosed in implementations provided herein may be implemented in other manners. For example, the device/apparatus implementations described above are merely illustrative; for instance, the division of the unit is only a logical function division and there can be other manners of division during actual implementations, for example, multiple units or components may be combined or may be integrated into another system, or some features may be ignored or not performed. In addition, coupling or communication connection between each illustrated or discussed component may be direct coupling or communication connection, or may be indirect coupling or communication connection among devices or units via some interfaces, and may be electrical connection, or other forms of connection.

The units described as separate components may or may not be physically separated, the components illustrated as units may or may not be physical units, that is, they may be in the same place or may be distributed to multiple network elements. All or part of the units may be selected according to actual needs to achieve the purpose of the technical solutions of the implementations.

In addition, the functional units in various implementations of the present disclosure may be integrated into one processing unit, or each unit may be physically present, or two or more units may be integrated into one unit. The above-mentioned integrated unit can be implemented in the form of hardware or a software function unit.

The integrated unit may be stored in a computer-readable memory when it is implemented in the form of a software functional unit and is sold or used as a separate product. Based on such understanding, the technical solutions of the disclosure essentially, or the part of the technical solutions that contributes to the related art, or all or part of the technical solutions, may be embodied in the form of a software product which is stored in a memory and includes instructions for causing a computer device (which may be a personal computer, a server, or a network device and so on) to perform all or part of the steps described in the various implementations of the present disclosure. The memory includes various medium capable of storing program codes, such as a universal serial bus (USB) flash disk, a ROM, a RAM, a removable hard disk, a disk, a CD, or the like.

It will be understood by those of ordinary skill in the art that all or a part of the various methods of the implementations described above may be accomplished by means of a program to instruct associated hardware, the program may be stored in a computer-readable memory, which may include a flash memory, a ROM, a RAM, a disk or a CD, and so on.

The foregoing illustrates the implementations of the present disclosure in detail. The principle and implementations of the present disclosure are illustrated by specific examples. The illustration of the above implementations is merely used to facilitate understanding of the methods and core concept of the present disclosure. For a person skilled in the art, according to the concept of the present disclosure, specific implementations and application ranges may be both changed. Based on the above, the present disclosure shall not be understood to be limited to the specification.

What is claimed is:

1. A method for link aggregation, being applicable to an electronic device, the method comprising:
   acquiring link tag information in a first data packet to be transmitted;
   determining, from a plurality of wireless communication links enabled, a first wireless communication link corresponding to the link tag information in the first data packet;
   transmitting the first data packet via a link interface of the first wireless communication link;
   determining, based on a split-screen operation for two applications and that the two applications comprise a game application, a transmission delay of a wireless communication link enabled;
   enabling, based on that the transmission delay is longer than a preset delay threshold, at least one wireless communication link other than the wireless communication link enabled; and
   determining the wireless communication link enabled and the at least one wireless communication link enabled as the plurality of wireless communication links enabled.

2. The method of claim 1, wherein the electronic device further comprises a plurality of second data packets to be transmitted; and
   the method further comprises:
      dividing, according to link tag information in each of the plurality of second data packets, the plurality of second data packets into a plurality of groups of second data packets, each of the plurality of groups of second data packets having same link tag information;
      determining a plurality of second wireless communication links, the plurality of second wireless communication links being in correspondence with link tag information in the plurality of groups of second data packets; and
      transmitting each of the plurality of groups of second data packets via a link interface of a corresponding second wireless communication link.

3. The method of claim 1, further comprising:
   determining, based on that the first data packet is in cache status, a data stream corresponding to the first data packet;
   determining the first wireless communication link corresponding to the data stream according to a first mapping relationship between the plurality of wireless communication links and a plurality of data streams; and
   querying a routing table to add the link tag information corresponding to the first wireless communication link to the first data packet, the routing table containing a correspondence relationship between link tag information and the plurality of wireless communication links.

4. The method of claim 3, further comprising:
   determining the data stream corresponding to the first data packet according to a data type of the first data packet.

5. The method of claim 3, further comprising:
   determining a maximum transmission rate of each of the plurality of wireless communication links within a first preset period;
   determining a data stream allocation weight for each of the plurality of wireless communication links according to the maximum transmission rate of each of the plurality of wireless communication links; and
   establishing the first mapping relationship between the plurality of wireless communication links and the plurality of data streams according to the data stream allocation weight for each of the plurality of wireless communication links.

6. The method of claim 5, wherein determining the data stream allocation weight for each of the plurality of wireless communication links according to the maximum transmission rate of each of the plurality of wireless communication links comprises:
   determining a sum of the maximum transmission rates of the plurality of wireless communication links as a first reference value; and
   determining the maximum transmission rate of each of the plurality of wireless communication links divided by the first reference value as the data stream allocation weight for each of the plurality of wireless communication links.

7. The method of claim 5, wherein establishing the first mapping relationship between the plurality of wireless communication links and the plurality of data streams according to the data stream allocation weight for each of the plurality of wireless communication links comprises:
   sorting the plurality of data streams according to data types;
   dividing, in the order of the plurality of data streams, the plurality of data streams into a plurality of groups of data streams according to a number of the plurality of wireless communication links and the data stream allocation weight for each of the plurality of wireless communication links, the number of the plurality of groups of data streams and the number of the plurality of wireless communication links being the same; and
   determining a correspondence between the plurality of wireless communication links and the plurality of groups of data streams to establish the first mapping relationship between the plurality of wireless communication links and the plurality of data streams.

8. The method of claim 5, wherein establishing the first mapping relationship between the plurality of wireless communication links and the plurality of data streams according to the data stream allocation weight for each of the plurality of wireless communication links comprises:

dividing, according to the data stream allocation weight for each of the plurality of wireless communication links, the plurality of wireless communication links into a first group of wireless communication links, a second group of wireless communication links, and a third group of wireless communication links; and establishing the first mapping relationship between the plurality of wireless communication links and the plurality of data streams according to a preset mapping relationship between the plurality of data streams and the first group of wireless communication links, the second group of wireless communication links, and the third group of wireless communication links.

9. An electronic device, comprising:
a processor; and
a memory, configured to store one or more programs which, when executed by the processor, cause the processor to:
  acquire link tag information in a first data packet to be transmitted;
  determine, from a plurality of wireless communication links enabled, a first wireless communication link corresponding to the link tag information in the first data packet;
  transmit the first data packet via a link interface of the first wireless communication link;
  determine, based on a split-screen operation for two applications and that the two applications comprise a game application, a transmission delay of a wireless communication links enabled;
  enable, based on that the transmission delay is longer than a preset delay threshold, at least one wireless communication link other than the wireless communication link enabled; and
  determine the wireless communication link enabled and the at least one wireless communication link enabled as the plurality of wireless communication links enabled.

10. The electronic device of claim 9, wherein the electronic device further comprises a plurality of second data packets to be transmitted, and
the one or more programs further cause the processor to:
  divide, according to link tag information in each of the plurality of second data packets, the plurality of second data packets into a plurality of groups of second data packets, each of the plurality of groups of second data packets having same link tag information;
  determine a plurality of second wireless communication links, the plurality of second wireless communication links being in correspondence with link tag information in the plurality of groups of second data packets; and
  transmit each of the plurality of groups of second data packets via a link interface of a corresponding second wireless communication link.

11. The electronic device of claim 9, wherein the one or more programs further cause the processor to:
  determine, based on that the first data packet is in cache status, a data stream corresponding to the first data packet;
  determine the first wireless communication link corresponding to the data stream according to a first mapping relationship between the plurality of wireless communication links and a plurality of data streams; and
  query a routing table to add the link tag information corresponding to the first wireless communication link to the first data packet, the routing table containing a correspondence relationship between link tag information and the plurality of wireless communication links.

12. The electronic device of claim 11, wherein the one or more programs further cause the processor to:
  determine the data stream corresponding to the first data packet according to a data type of the first data packet.

13. The electronic device of claim 11, wherein the one or more programs further cause the processor to:
  determine a maximum transmission rate of each of the plurality of wireless communication links within a first preset period;
  determine a data stream allocation weight for each of the plurality of wireless communication links according to the maximum transmission rate of each of the plurality of wireless communication links; and
  establish the first mapping relationship between the plurality of wireless communication links and the plurality of data streams according to the data stream allocation weight for each of the plurality of wireless communication links.

14. The electronic device of claim 13, wherein the one or more programs executed by the processor to determine the data stream allocation weight for each of the plurality of wireless communication links according to the maximum transmission rate of each of the plurality of wireless communication links are executed by the processor to:
  determine a sum of the maximum transmission rates of the plurality of wireless communication links as a first reference value; and
  determine the maximum transmission rate of each of the plurality of wireless communication links divided by the first reference value as the data stream allocation weight for each of the plurality of wireless communication links.

15. The electronic device of claim 13, wherein the one or more programs executed by the processor to establish the first mapping relationship between the plurality of wireless communication links and the plurality of data streams according to the data stream allocation weight for each of the plurality of wireless communication links are executed by the processor to:
  sort the plurality of data streams according to data types;
  divide, in the order of the plurality of data streams, the plurality of data streams into a plurality of groups of data streams according to a number of the plurality of wireless communication links and the data stream allocation weight for each of the plurality of wireless communication links, the number of the plurality of groups of data streams and the number of the plurality of wireless communication links being the same; and
  determine a correspondence between the plurality of wireless communication links and the plurality of groups of data streams to establish the first mapping relationship between the plurality of wireless communication links and the plurality of data streams.

16. The electronic device of claim 13, wherein the one or more programs executed by the processor to establish the first mapping relationship between the plurality of wireless communication links and the plurality of data streams according to the data stream allocation weight for each of the plurality of wireless communication links are executed by the processor to:
  divide, according to the data stream allocation weight for each of the plurality of wireless communication links, the plurality of wireless communication links into a first group of wireless communication links, a second group of wireless communication links, and a third group of wireless communication links; and establish the first mapping relationship between the plurality of wireless communication links and the plurality of data streams according to a preset mapping relationship between the plurality of data streams and the first group of wireless communication links, the second group of wireless communication links, and the third group of wireless communication links.

17. A non-transitory computer readable storage medium, being applicable to an electronic device and configured to store computer programs, and the computer programs, when executed by a processor, cause the processor to:

determine a data stream corresponding to a first data packet to be transmitted;

determine, from a plurality of wireless communication links enabled, a first wireless communication link corresponding to the first data packet according to a mapping relationship between the plurality of wireless communication links and a plurality of data streams;

transmit the first data packet via a link interface of the first wireless communication link;

determine, based on a split-screen operation for two applications and that the two applications comprise a game application, a transmission delay of a wireless communication links enabled;

enable, based on that the transmission delay is longer than a preset delay threshold, at least one wireless communication link other than the wireless communication link enabled; and determine the wireless communication link enabled and the at least one wireless communication link enabled as the plurality of wireless communication links enabled.

18. The non-transitory computer readable storage medium of claim 17, wherein the computer programs, when executed by the processor, further cause the processor to:

determine the data stream corresponding to the first data packet according to a data type of the first data packet.

* * * * *